United States Patent [19]

Cailliot et al.

[11] 4,007,675

[45] Feb. 15, 1977

[54] COFFEE MILL

[76] Inventors: Serge Leon Louis Cailliot, 38, Rue de Bois de Boulogne; Leopold Guy Pierre Andre, 26, Boulevard du Chateau, both of, 92200 Neuilly-sur-Seine, France

[22] Filed: Jan. 13, 1975

[21] Appl. No.: 540,539

[30] Foreign Application Priority Data

Jan. 14, 1974 France .......................... 74.01180
Oct. 11, 1974 France .......................... 74.34285

[52] U.S. Cl. ............................... 99/286; 99/287; 99/289 R; 241/36

[51] Int. Cl.² ..................................... A47J 31/42

[58] Field of Search ............ 99/286, 486, 488, 287, 99/289; 241/36, 82.1, 198, 246, 247, 260.1; 192/125 A, 125 D; 318/475, 476, 482

[56] References Cited

UNITED STATES PATENTS

| 518,047 | 4/1894 | Snow | 241/82.1 |
| 581,836 | 5/1897 | Taylor | 241/246 |
| 1,189,035 | 6/1916 | Asbury et al. | 99/286 X |

FOREIGN PATENTS OR APPLICATIONS

| 536,534 | 2/1955 | Italy | 241/82.1 |

*Primary Examiner*—Robert W. Jenkins
*Attorney, Agent, or Firm*—Brisebois & Kruger

[57] ABSTRACT

A coffee mill comprising a vertical screw of generally cylindrical form, provided with at least one helical groove and mounted to cooperate with a truncated conical crushing chamber having a section decreasing towards a cylindrical bore at the lower end of the chamber, which section serves to guide the lower part of the said screw, said groove having a pitch which decreases progressively towards its lower end, and a depth which decreases progressively towards its lower end.

8 Claims, 10 Drawing Figures

COFFEE MILL

The problem of preparing homogeneous coffee grounds and conserving all the aroma before being infused in boiling water has never been completely solved.

In fact, most coffee mills of known types at a very high speed and are of the so-called blade type in which the grains of coffee are struck at random repeated by the blades of a beater driven by a suitable electric motor on which the grains are retained by the inner walls of the enclosure which contains them.

However, this type of mill has two big inconveniences. The first is the fact that the laws of chance which govern the breaking-down of the coffee grains and their fracture into a large number of particles does not enable a homogeneous mixture to be obtained, that is to say, constituted by grains of dimensions lying within relatively close limits.

Most coffee grounds used at the present time in domestic coffee makers and in coffee machines of the "expresso" type are on the contrary constituted by grains of very variable grain size with very variable percentages of relatively large and relatively small particles.

However, experience has shown that the yield of a coffee maker, that is to say, the consumption of milled or non-milled coffee necessary to obtain a cup of coffee infusion of a predetermined strength and capacity varies considerably according to the degree of fineness of the grounds.

In fact, grounds constituted by relatively large particles do not permit, during the relatively small time in which they are in contact with boiling water, the extraction of a considerable percentage of the aromatic elements contained in the particles.

Conversely, in the case of too fine grounds, the boiling water completely impregnates each particle from one side to the other and the grounds are subjected to the action of boiling water in the form of a sludge restraining the extraction of the aromatic products contained in the said particles by the boiling water.

Moreover, and this is surely the most severe disadvantage, the speed of very high driving speed of the blades of the said beater and of successive strikings of the grains on the blades and on the inner walls of the mill enclosure provoke a very important heating of the grounds which are destined to be subsequently subjected to the action of boiling water.

However, this heating particularly of the coffee powder, renders an escaping by evaporation of the lightest aromatic elements, notably of those which, irrespective of taste, confer on the infusion the aroma which the coffee lover seeks when drinking the beverage.

Another type of mill used equally for the preparation of coffee infusions uses a crushing screw of constant pitch co-operating with a constriction of a chamber-forming hopper which comprises likewise internal helical ribs capable of co-operating, by their crests of minimum diameter, with those of the threads of the crushing screw.

Although in this type of mill the screw is driven at a speed much lower than that utilised in blades mentioned above, the variable relative position between the housing threads and the rotor threads of such crushers, permits, according to the laws of chance, the passage of particles having a relatively large diameter, whereas for certain relative positions of the said rotor and the said housing the particles of the said grounds which can pass have a maximum diameter corresponding substantially to the difference of the radii of the crests of the respective ribs of the said rotor and the said housing.

The present invention has for its object a novel coffee mill rotating at a reduced speed and capable of providing homogenous coffee grounds subjected only to negligeable heating and, in consequence not losing during the crushing, a substantial part of the aromatic products contained in the unmilled coffee.

To achieve this result the applicant has provided a cylindrical screw of variable pitch comprising a thread of a pitch progressively diminishing towards the bottom, the top part of the thread presenting a strong inclination relative to the horizontal, whilst the outlet of the groove comprised between the adjacent spirals of the said screw is horizontal.

Moreover, the thread of this screw of predetermined variable pitch has between its successive spirals, a groove of generally helical form, of which the depth diminishes equally towards the bottom in progressive fashion at the same time as the pitch.

The said variable pitch screw of which the height is adjustable relative to the cylindrical base of the chamber which enclosed it and where the coffee grains are disposed, in order to permit simultaneous control of the fineness of the grounds and of the output of the said mill, co-operates with a chamber which is shaped as a truncated cone bilobate section of generally elliptical form, an interior rib at the two extremities of the short axis of the main ellipses of the said truncated zone and extending towards the bottom by a cylindrical part on all sides of which are seen two equi-distant vertical slots of shallow depth of the order of about 5/10 mm. open at their lower port and certain of which permit the descent of the grounds towards an ejection neck for ground coffee by gravity.

The internal ribs mentioned above have a progressively decreasing thickness to a value of zero to the level of joining with the said lower cylindrical part.

This thickness is of the order of a sixth of the length of the short axis of the said main ellipses.

Moreover, the symmetrically inwardly curved faces of the ribs, separated by the sharp crests join to the elliptical parts of the said truncated cone on all sides of the said short axis, tangentially, of the said main ellipses, forming two lobes of the said bilobate section.

In the above mentioned slots the permissible play between the screw and the lower cylindrical part of the said chamber is of the order of 1/10 mm.

Thanks to the bilobate form of this chamber, the coffee grains finding themselves in the groove of the said screw are progressively driven towards the bottom by rotation of the screw gradually so they tend to pass individually from a part of maximum diameter to a part of minimum diameter of the said truncated cone, in such a way as to stay constantly in the part of the truncated cone corresponding to the major axis of the main ellipse.

When these grains reach the lower cylindrical part of small diameter which surrounds the said screw with a small play of the order of 0.1 mm, the rotation of the screw tends to produce simultaneously a crushing effect and to make the crushed particles penetrate into the said interior slots where these particles pack themselves to plugs capable of opposing any eventual rising of the vapour in the coffee grains when the said mill is placed for example below a machine for coffee infusion with a mill incorporated.

It will be noticed that the fineness of the grounds is determined by the depth of the groove of the screw at the level of the lower part of the said vertical slots.

In fact, during the descent of the coffee particles which find themselves in the said slots, these particles are constantly subjected to the crushing action of the said screw until their maximum dimensions correspond to the distance between the base of the said helical groove and the cylinder in which the said crushing screw turns at the level of the lower part of the said vertical slots.

If the screw descends to the interior of the above mentioned enclosure, the grounds obtained will be relatively large, because, at the level of the lower part of the said vertical slots, the depth of the groove of the crushing screw is greatest, and as this lower part is in communication with the upper part of a chute for the descent of ground coffee the maximum diameter of the particles will be able to be substantially larger than if the said depth of the groove was nil, for example, the position considered.

If, on the contrary, the screw is raised further, utilising to this effect a common apparatus comprising a knurled button, and a threading co-operating with a tapping in a fixed support, the rotary movement of the said knurled button changes easily into a translational movement of the said screw of which the rotation without appreciable friction is assured by the intermediary of a ball abutment.

It should be understood that the pressure exerted by the rotation of the screw on the particles which are accumulated and enclosed in the vertical slots mentioned above, is applied on the whole height of these slots, but, however, it is at the level of the lower part of the said slots that this pressure is the greatest, due to the fact that the depth of the groove in the crushing screw is least this level, and the said particles are then ejected in a collecting chamber for ground coffee from which the grounds can descend, for example by gravity, into a receiver provided for receiving it.

Independently of this question of homogeneity of the grounds, and of the possibility of controlling the fineness of the latter, the novel mill according to the present invention presents equally the the advantage that the reduced speed of driving of the said screw and the elimination of the internal teeth on the housing, allow the obtaining of grounds at lower temperature since they have not had the time to be heated during crushing.

This possibility avoids the significant loss, by evaporation, of the aromatic products contained in the unground coffee.

The coffee mill of the present invention can be provided, in addition, with a number of improvements.

Significantly it can comprise an apparatus for automatic stopping by weighing, utilizing, for example, a pivoted platform supporting a grounds collector and subjected to the action of a return spring under the control of a microswitch inserted in the motor circuit of the said screw, when a predetermined quantity of grounds is obtained.

Further, in a preferred variant for putting the invention into practice the mill housing is fixed to a horizontal cam which acts in combination with a return spring, to ensure the feed of the said motor only to the level of a raised portion of the said cam, an automatic stop being obtained by means of this cam, when the coffee mill is empty or when an abnormal resistance develops between the rotor and housing, for example, if amongst the grains to be ground an abnormally hard body is found.

All rotation of small amplitude of this cam integral with the housing, whether in the same sense as that of the screw, in the first case envisaged, when under the effect of an abnormal resistance due to the presence in the coffee grains having an abnormally hard body, and capable to provoke the pivoting of a transmission arm normally actuated by the said pivoted platform, or in the opposite sense, under the influence of a second return spring, which can only act when the enclosure for containing the coffee grains is empty and no longer has the tendency to be entrained in rotation by friction in the same direction as the screw cuts off the supply to the said motor.

In a variant embodiment the feed chute of the said recipient collector can be associated with the said housing. One can then utilise this chute to manually control the starting or stopping of the said motor.

Another advantage of the new mill according to the present invention resides in the fact that the driving of the said screw is assured by the intermediary of a catch and of a centrifugal weight apparatus in such a way that the starting is made when the mill is empty and that the electric motor does not have to overcome a substantial resistance until the motor has substantially achieved the speed of synchronism.

This combination permits considerable reduction in weight, the complication and the cost price of the synchronous motor of the said mill.

The characteristics of the present invention will be better understood by reading the description which follows of one embodiment of the coffee mill according to the said invention, the embodiment given by way of non limitative example and described with reference to the attached drawings in which.

Figure 1:
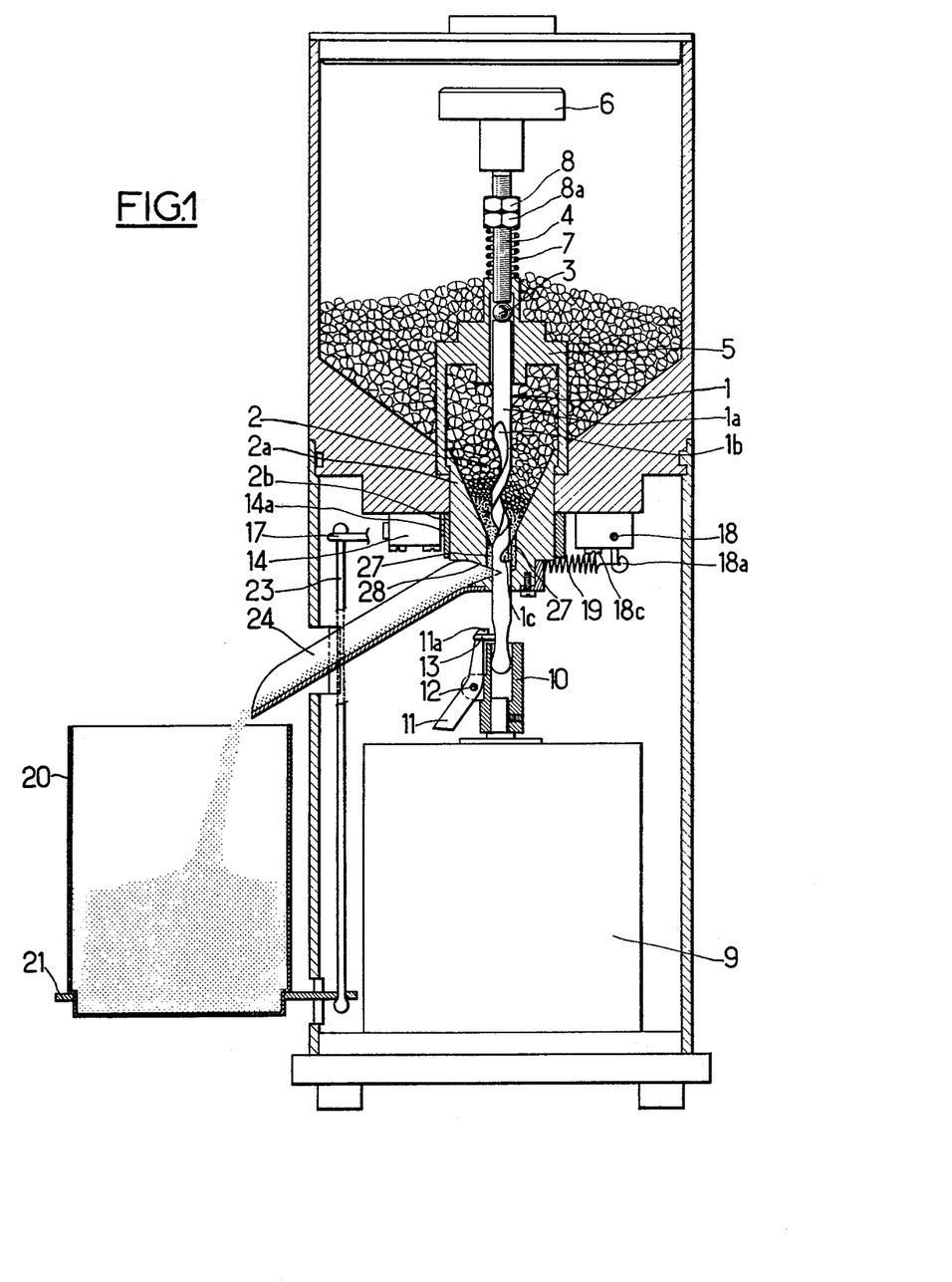
FIG. 1 is a vertical section of the said embodiment coffee mill according to the invention shown in operation.
Figure 2:
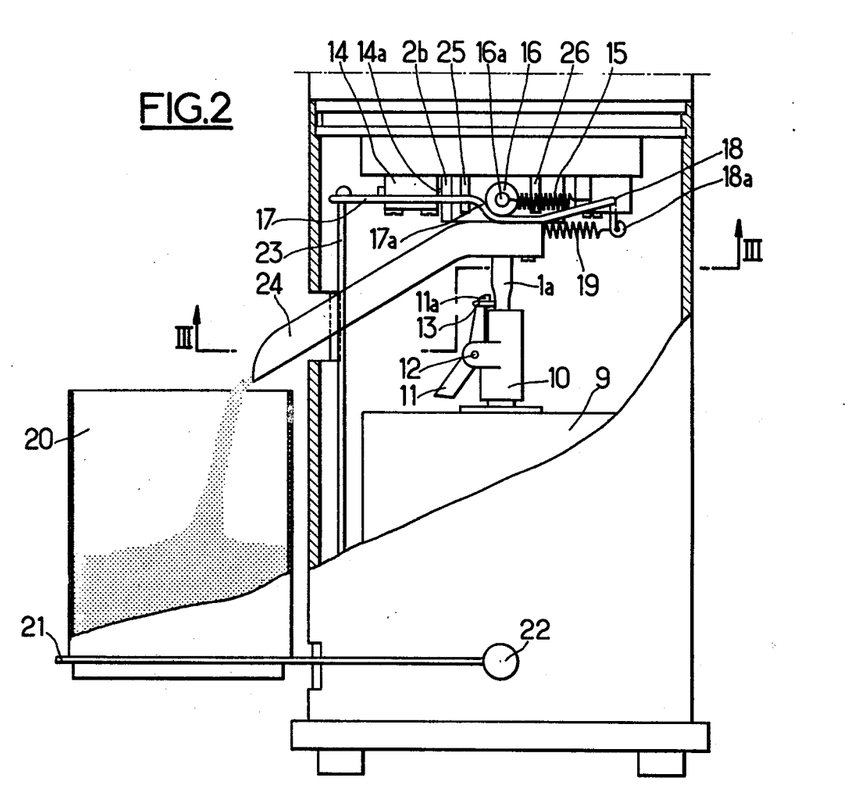
FIG. 2 is a view in elevation of the lower part of the mill of FIG. 1 with part of the casing of the mill cut away.

It is seen in FIG. 1 that the crushing screw 1a is constituted by notching of a cylindrical rod 1 following a variable pitch, decreasing regularly from the upper part 1b to the lower part 1c of the said notched part.

As stated above the depth of the thread varies progressively in the same fashion as the pitch, decreasing from the upper part 1b of the crushing screw to the lower part 1c where the gap separating two neighbouring spirals is oriented horizontally.

This crushing screw co-operated with a truncated conical chamber 2 of bilobate section, communicating with a cylindrical lower part at the interior of which the screw 1 can turn with a small play, and which is furnished with two diametrically opposed vertical slots, in which the milled coffee tends to fall and compress itself under the effect of the rotation of the said crushing screw.

We have previously indicated the advantages of plugs so formed in particular in the case of coffee makers of machines with coffee mills incorporated.

It is easy to understand that when the crushing screw meets the resistance of the ground coffee, it has a tendency to climb up, but it is blocked at the upper end by an abutment ball, on which acts the other part, a regulating rod 4 comprising a threaded part co-operating with a tapping arranged in a fixed part 5 permitting a control of the height of the said regulating rod 4, of the abutment ball 3 and of the crushing screw 1, control being made by acting on a button 6 against the action of a spring 7 maintained in compression by a nut 8 and a counter-locking nut 8a, co-operating similarly with the thread of the rod 4.

As already indicated, the control of height of the screw 1 relative to the truncated conical chamber 2 enables control of the fineness of the grounds obtained, as will be seen in more detail in regard to FIG. 8 below.

The crushing screw 1 can be driven in rotation by a motor 9 by the intermediary of a rotatable boss 10, on which is mounted a weight 11, which under the effect of centrifugal force tends to pivot about an axis 12 and to come to drive the said crushing screw by pushing on a catch 13 of the lower part of this screw, when the pivotting of the said weight is sufficient to bring back its upper extremity 11a to the level of the said catch 13.

As already mentioned, the combination of this screw of which the groove has a depth and a pitch decreasing towards the bottom, with a chamber presenting a bilobate section, is the principal characteristic of the mill of the present invention.

However, the provision of the weight 11 and of its pivotal mounting about the axis 12 makes it possible to drive the crushing screw only when the motor 9 has substantially attained its synchronous speed, and can provide a driving torque sufficient to overcome the resistance due to the presence of coffee grains to be milled.

This last charasteric permits a substantial reduction of dimensions, weight and cost price of the synchronous motor to drive the crushing screw to be obtained.

Referring now particularly to FIGS. 2–5, it can be seen that the housing 2a the internal surface of which forms the truncated conical surface 2 mentioned above, is normally driven in rotation by friction due to the presence of coffee grains contained in thesaid chamber, this driving being in the direction of rotation of the crushing screw 1.

However, this housing 2a has, as a part of its periphery, profile 2b in the form of a cam, which co-operates with the pusher 14a of a microswitch 14 inserted in the feed circuit to the motor 9.

Figure 3:
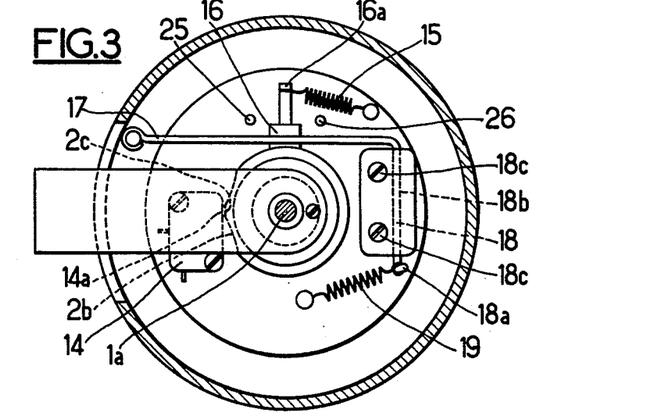
FIG. 3 is a view from below of the said lower part on the lines III—III of FIG. 2.

The housing 2a is normally maintained in the medium position of the said cam 2b, shown in particular on FIG. 3, due to the action of a return spring 15 acting on the rod 16a of a roller 16 and due to the presence of an ablique part 17a of a transmission lever capable of pivoting about the axis of a linear part 18 of which the extremity 10a is placed under the action of a return spring 19.

During normal functioning, when the chamber 2 is full of coffee, the motor 9 is then fed by co-operation between the median part 2c of the cam 2b and the said pusher 14a.

Figure 4:
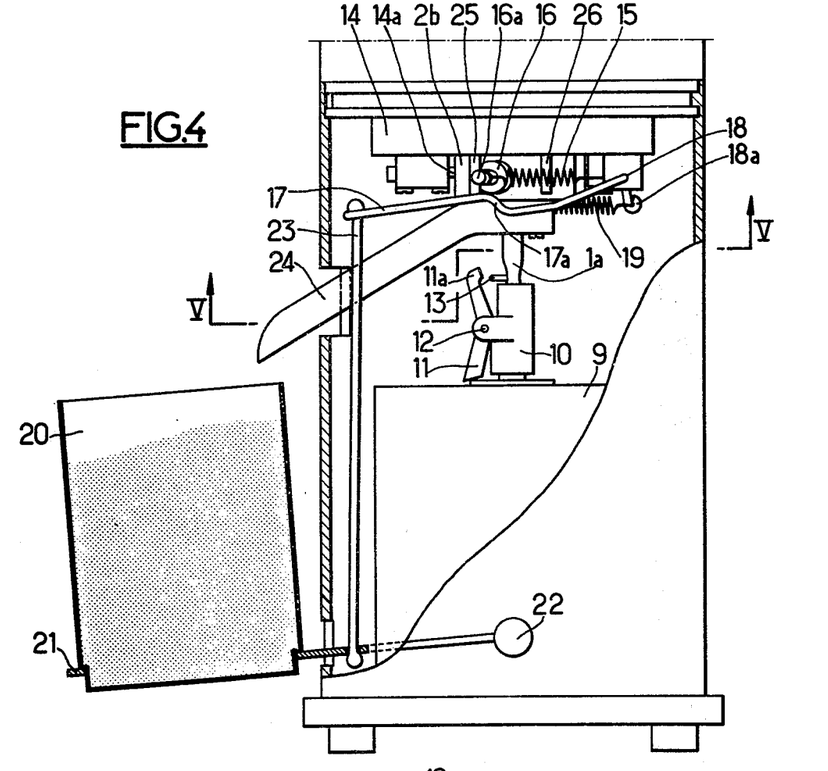
FIG. 4 is a view in elevation of the same lower part as shown in FIG. 2, and comprising equally a partial cutting away of the said casing, the said mill being represented in the stopped position, and with the feed to its driving motor cut as a result of the presence in the apparatus of an abnormally hard grain or of a sufficient predetermined quantity of coffee grounds in the receiver provided for the reception of the exit of the said mill.

When the receiver 20 provided for receiving the milled coffee and which is equally visible in FIG. 1, has received a predetermined quantity of coffee, as is seen in FIG. 4, the pivotable platform 21 on which the receiver 20 is mounted, pivots towards the bottom about a horizontal axis 22 and rotates by the intermediary of a connecting rod, 23, the blocking rod 17 of the roller 16 against the action of the return spring 19.

The roller 16 can then be displaced towards the left against the action of return spring 15, which permits the subjection to the action of the boss 2c of the cam 2b on the pusher 14a and assures the cutting of the feed of the motor 9.

The motor then stops, as does the crushing screw of the mill which stops the descent of milled coffee into the receiver 20 by the intermediary of the chute 24 visible in FIGS. 1 to 5.

In the embodiment illustrated by the drawing, the chute 24 is driven in rotation in the same time as the stator 2a, at the direction of rotation of the crushing screw 1, which enables the eventual utilisation of this chute for starting the said mill, and, if desired, to manually cut its feed.

This embodiment is however optional and one can equally provide a chute being of fixed orientation independently of the position of the stator 2a.

We are now going to explain what happens not when the receiver 20 has received a predetermined quantity of milled coffee, but when an abnormally hard body is present amongst the grains.

Figure 5:
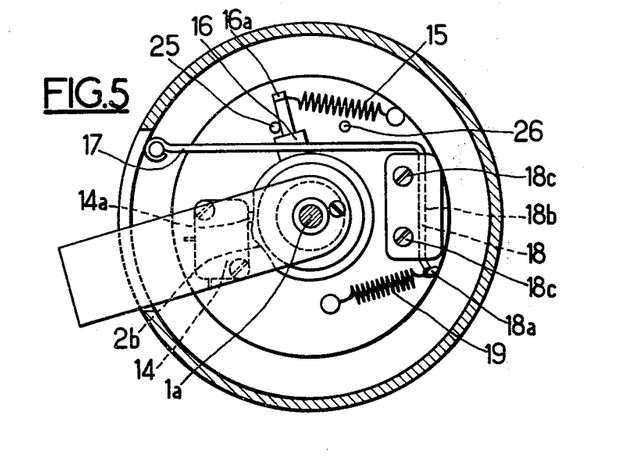
FIG. 5 is similarly a view from below of the said lower part on lines V—V of FIG. 4.

At this moment the driving of the housing 2a by the the grains of coffee becomes sufficiently strong to overcome simultaneously the springs 15 and 19 and to permit the roller 16 and its axis 16a to strike a limit position, illustrated in FIG. 5, and for which this axis 16a is in abutment against a fixed peg 25.

This abnormal resistance permits then the roller to push towards the bottom of the lever 17 and the connecting rod 23, as in the case where the movement of the roller 16 towards the left is created by tipping of the platform 21.

It is understood then that in the case of an abnormally hard grain, the feed of the motor 9 is cut by rotation of the cam 2b and cessation of the action of the boss 2c on the pusher 14a in the same fashion as in the case of the tilting of the platform 21 when the receiver 20 has received a predetermined quantity of milled coffee.

The extremity of the lever 17 is visible at 18a in FIGS. 2 to 5 and this extremity is under the action of the return spring 19 which tends normally to bring the lever 17 upwardly.

The pivoting of the lever 17 about the linear part 18 is easily understood from FIGS. 3 to 5 where it can be seen that this part 18 turns to the interior of a cylindrical block 18b, for example, by means of two screws 18c.

Figure 6:
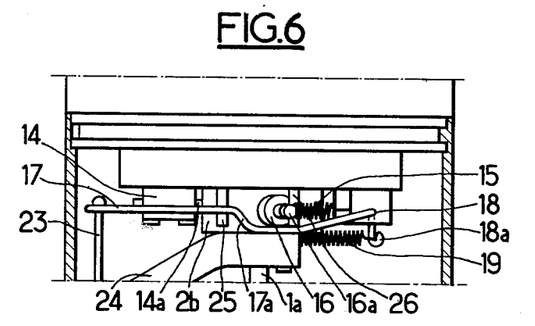
FIG. 6 is similarly a view from below of the same lower part comprising a cutting away of the said casing, the mill being represented in the stopped position and the feed to its driving motor cut as a result of a failure of feed to the said mill of unground coffee.

We are now going to explain what happens when the chamber 2 is empty, and all the coffee grains which were in these have been milled. In this case, the stator 2a no longer has a tendency to be to be driven in rotation by the crushing screw and the spring 15 can then bring back the roller 16 towards its other extreme position, for which axis 16a comes into abutment against a second peg 26.

It is easy to understand that in this case the part 2c of the cam 2b similarly ceases to act on the pusher 14a of the microswitch 14, which provokes in the same fashion the cutting of the feed of the motor 9.

This displacement towards the right of the roller 16 and of axis 16a, to where it comes into abutment against the peg 26 is without action of the levers 17 and 23, the extremity 18a of the lever 17 remaining under the action of the return spring 19.

Thanks to the co-operation between the median part2c of the cam 2b and the pusher 14a of the microswitch 14, the cutting of the feed to the motor 9 can be provoked in the three following cases:

a. obtaining in the receiver 20 a predetermined quantity of milled coffee, adjustable as desired.

b. the presence in the grains of coffee of an abnormally hard body, c. the absence of coffee grains in the crushing chamber 2.

Figure 7:
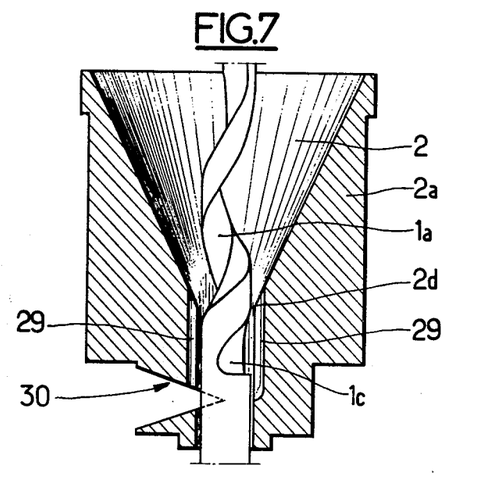
FIG. 7 is a vertical section on an enlarged scale of the crushing enclosure of the said mill.
Figure 8:
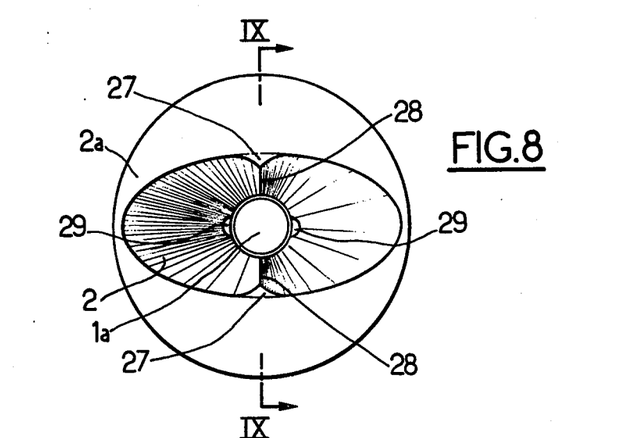
FIG. 8 is a view of the said enclosure from below, showing the form of the upper part of this truncated conical chamber destined to receive the coffee grains.

We are now going to explain, with reference to FIGS. 7 and 8 the fashion in which the crushing of the coffee grains is produced in permitting the obtaining on one hand of milled coffee not being subjected to abnormal heating in the course of its crushing and not having lost by this fact an important part of its aroma, and on the other hand homogenous grounds, that is to say constituted by particles being substantially the same size.

The rod 1 of the crushing screw drives in its rotation the grains of coffee found in the chamber 2, in such a manner that those which are not crushed and which find themselves in the slot comprised between two contiguous spirals of the thread of the crushing screw are forcibly driven towards the bottom when they make their way towards the minor axis of the above mentioned main ellipses of the said truncated conical chamber. This driving towards the bottom increases due to the fact of the existence of internal ribs 27 of decreasing section towards the bottom, provided at the level of this minor axis.

These ribs have, as has been indicated above, a thickness at most equal to one sixth of the length of the said minor axis, and, moreover, the inwardly curved walls of these ribs join tangentially to the said main ellipses, following two symmetrical generatrices of the internal surface of the said truncated conical chamber.

Figure 9:
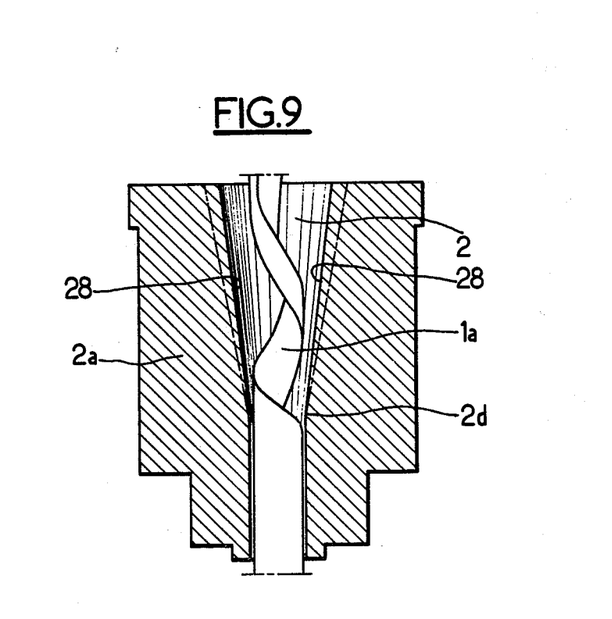
FIG. 9 is a vertical section of the crushing chamber on lines IX—IX of the said FIG. 8.

It can be seen in particular in FIG. 9 that the two sharp stops 28 of the said ribs of thickness decreasing towards the bottom, terminate at the level 2d of the upper part of the cylinder forming the lower part of the said crushing chamber.

Independently of the progressive crushing of the said particles thus obtained by the fact of their descent towards the lower restricted part of the above mentioned truncated conical chamber, the particles sufficiently fine to strike the lower part 2d of the said chamber can penetrate into two vertical slots 29 arranged in the stator 2a on all sides of the cylindrical bore in which the rod 1 turns.

Under the effect of the rotation of the crushing screw and of the decreasing depth of the groove of this screw, the particles of milled coffee which are driven towards the bottom, to the interior of the said slots 29, are crushed before they eventually strike a hollow 30 communicating with the lower part of at least one of these slots, as can be seen in FIG. 7 and which is provided to receive the upper part of the chute 24.

With regard to the slots which are closed at their lower part, the particles which are there are equally subjected constantly to the action of the said crushing screw and to a driving by this screw as far as a slot in communication with the above mentioned chute.

It is due to the possibility of obtaining such cold and homogeneous grounds, that one can subsequently obtain a coffee infusion having retained all the aromatic fractions of the coffee grains with a minimum consumption of coffee.

As stated above the confinement of the milled coffee to the interior of the slots 29 presents another advantage, that of totally opposing the rising of the water vapour in such a mill, when it is incorporated in a coffee making machine or a domestic coffeemaker and serves to feed with milled coffee an infusion chamber fed on the other hand with water at its boiling temperature and placed beneath the said mill.

Figure 10:
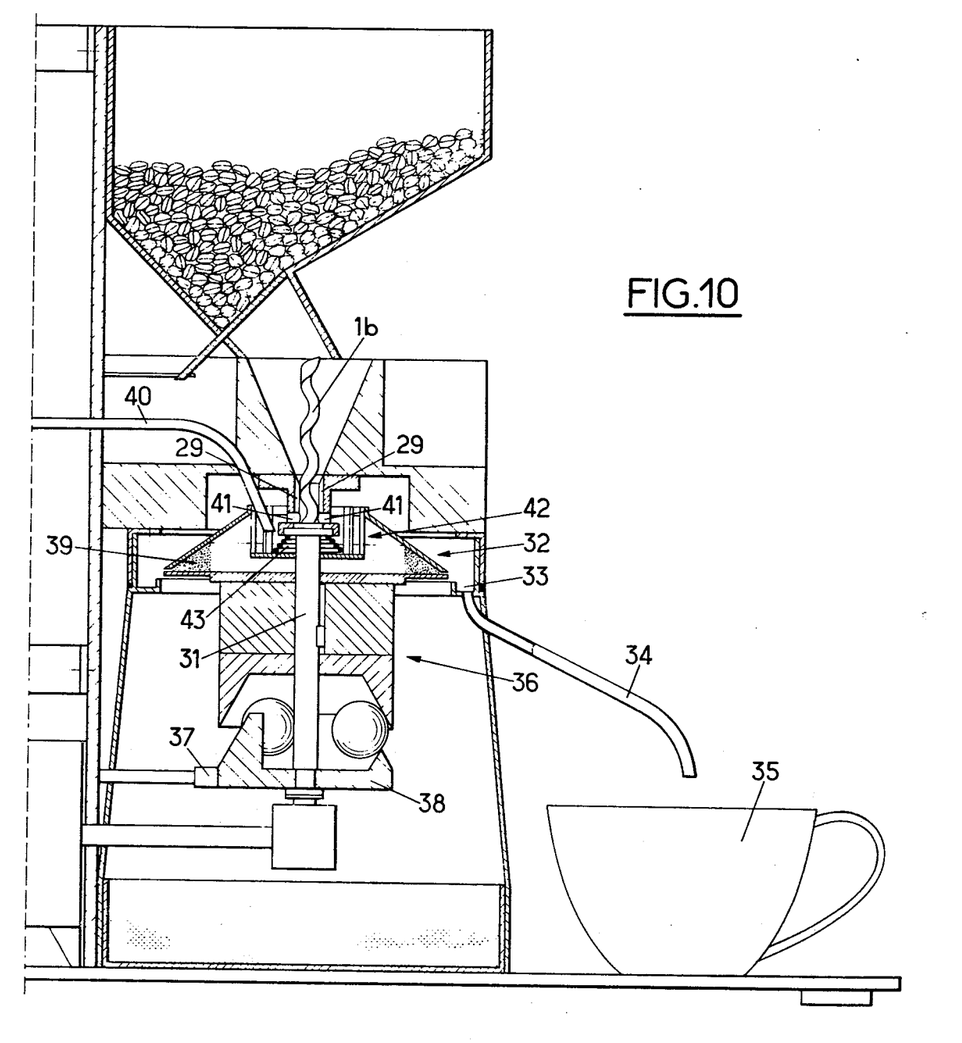
FIG. 10 is a vertical sectional view through a second embodiment of the invention, in which the mill is mounted above an infusion chamber.

Such an arrangement is shown in FIG. 10. In this figure the infusion chamber 32 is supplied with milled coffee through the slots 29 and apertures 41, and with boiling water through the supply duct 40. The resulting infusion flows out through the grounds 39, the peripheral chamber 33, and outlet duct 34 into a cup 35 or any other suitable container. As shown in applicant's copending application Ser. No. 483,516 (now U.S. Pat. No. 3,967,546) a centrifugal regulator 36, 38, controlled by a brake 37 cooperates with a spring 43 to control the peripheral distance between the upper and lower members defining the infusion chamber, and thus the rate of flow therefrom.

It is well understood that one can add to the embodiment which has been described diverse improvements, changes or additions and that one can replace certain elements by equivalent elements without changing the general economy of the invention.

One can, notably in adjusting the tension of the spring 19, vary the predetermined quantity of coffee for which the pivoting of the said platform towards the bottom provokes that of the said transmission lever and frees the said roller.

It will be noticed that with the more reduced speeds of rotation of the crushing screw, it could become advantageous to provide internal ribs similar to the two ribs 27 described above, following different generatrices of a truncated cone of generally elliptical form, and not only at the level of the minor axis of the main ellipses of the truncated cone.

What we claim is:

1. A coffee mill comprising a vertical screw of generally cylindrical form, provided with at least one helical groove and mounted to cooperate with a truncated conical crushing chamber having a substantially elliptical section decreasing in diameter towards a cylindrical bore at the lower end of the chamber, which bore serves to guide the lower part of the said screw, said groove having a pitch which decreases progressively towards its lower end, and a depth which decreases progressively to zero as it approaches its lower end, the cylindrical bore having at least two longitudinally extending diametrically opposed channels in the wall thereof, at least one of said channels communicating with a duct adapted to receive the upper part of a delivery chute for the delivery of milled coffee under gravity.

2. A coffee mill according to claim 1 comprising a spring and at least one intermediate ball which hold said screw in abutment against a threaded rod which is axially displaceable by means of a knob, the said threaded rod and knob being located above the upper end of the screw; and axial displacement of said rod permitting adjustment of the fineness of the coffee grounds by adjusting the space between the said screw and the chamber over the total length of the said screw and, by also adjusting the relative position of the lower end of the helical groove relative to the duct.

3. A coffee mill according to claim 1 comprising an infusion chamber beneath said crushing chamber and in which the dimensions of the said longitudinally extending channels are such that rotation of the said screw causes sufficient compression of milled coffee in the interior of the channels around the lower part of the said screw, to prevent the passage of water vapor through said channels when said infusion chamber is filled with boiling water.

4. A coffee mill according to claim 1 comprising means for driving said screw and in which the truncated conical chamber is part of a housing mounted to be rotationally driven in the same direction as the crushing screw through the coffee grains in the chamber, and comprising a member associated with said housing positioned to operate a microswitch when the torque applied through said grounds in said housing departs from a predetermined range of values.

5. A coffee mill according to claim 4 comprising a motor connected to drive said mill and in which said member is a double-acting cam cooperating with the actuating element of said microswitch in a way such that the current to the motor is supplied only in a median position of the housing and cam, normally reached when the housing is rotated through the coffee grains, the housing being provided with a roller carried by the free end of a return spring, and which roller can cooperate with two abutments for limitation of the angular displacements of the said housing, the roller being retained in the median position when said housing is subjected to a torque within said predetermined range by an oblique part of a cranked lever, pivoted about a perpendicular axis in the plane of the said oblique part, and biased by a second spring, so that movement of the cranked lever against its spring bias permits movement of the roller from the median position which in turn cuts off the current to the mill motor.

6. A coffee mill according to claim 5 in which the second spring is attached to one end of the lever and the other end cooperates with a vertical connecting rod controlled by a pivoted platform supporting a receiver for milled coffee placed under the delivery shute; the tension of the said return spring being adjustable, whereby the weight of milled coffee contained in the receiver when the cranked lever releases the roller from the means position can be adjusted; and the tension of the first return spring is chosen so as to be always lower than the driving force on the housing by virtue of the coffee grains when in the absence of abnormally hard grains.

7. A coffee mill according to claim 6 in which the thickness of each of the internal ribs is at most equal to one sixth of the length of the minor axis of the said ellipses.

8. A coffee mill according to claim 1 in which the horizontal sections of the said truncated conical chamber about a vertical axis are of bilobate form and this chamber comprises two diametrically opposed internal ribs at the ends of the minor axes of the ellipses defining said chamber, the ribs joining tangentially with the surface of the chamber, on all sides of the minor axis of the ellipses, and having a section which progressively decreases to zero from the upper part of the chamber to the cylindrical bore forming the lower part of the chamber.

* * * * *